US009256568B2

(12) United States Patent
Lin et al.

(10) Patent No.: US 9,256,568 B2
(45) Date of Patent: Feb. 9, 2016

(54) PCI-BASED INTERFACING DEVICE WITH MAPPABLE PORT ADDRESSES TO LEGACY I/O PORT ADDRESSES

(75) Inventors: Ming-Cheng Lin, New Taipei (TW); Chieh-Tung Chien, New Taipei (TW)

(73) Assignee: SUNIX CO., LTD., New Taipei (TW)

( * ) Notice: Subject to any disclaimer, the term of this patent is extended or adjusted under 35 U.S.C. 154(b) by 753 days.

(21) Appl. No.: 13/611,788

(22) Filed: Sep. 12, 2012

(65) Prior Publication Data

US 2013/0290579 A1 Oct. 31, 2013

(30) Foreign Application Priority Data

Apr. 27, 2012 (TW) .............................. 101115032 A

(51) Int. Cl.
*G06F 3/00* (2006.01)
*G06F 13/42* (2006.01)
(52) U.S. Cl.
CPC ..................................... *G06F 13/42* (2013.01)
(58) Field of Classification Search
CPC .............. G06F 13/404; G06F 13/4045; G06F 2212/206
USPC .......................................... 710/3, 4, 8, 9, 105
See application file for complete search history.

(56) References Cited

U.S. PATENT DOCUMENTS

| 5,548,746 | A  | * | 8/1996  | Carpenter et al. ................. 710/3 |
| 5,748,918 | A  | * | 5/1998  | Cho ....................... G06F 13/404 710/303 |
| 5,774,680 | A  | * | 6/1998  | Wanner .................... G06F 13/28 710/110 |
| 5,774,681 | A  | * | 6/1998  | Kunishige ...................... 710/306 |
| 5,864,688 | A  | * | 1/1999  | Santos ................ G06F 13/4045 710/11 |
| 5,890,011 | A  | * | 3/1999  | Abbondanzio et al. ........... 710/9 |
| 5,909,560 | A  | * | 6/1999  | Kenny et al. ................... 710/305 |
| 5,937,206 | A  | * | 8/1999  | Nakamura ....................... 710/22 |
| 5,968,151 | A  | * | 10/1999 | Williams ....................... 710/100 |
| 6,081,861 | A  | * | 6/2000  | Kelley et al. .................. 710/315 |
| 6,230,227 | B1 | * | 5/2001  | Fry et al. ....................... 710/314 |
| 6,622,244 | B1 | * | 9/2003  | Eidson .................. G06F 9/4403 710/3 |
| 6,799,220 | B1 | * | 9/2004  | Merritt et al. .................. 709/238 |
| 2006/0212627 | A1 | * | 9/2006  | Durham ................ G06F 13/409 710/100 |
| 2008/0172543 | A1 | * | 7/2008  | Ben-Yehuda ....... G06F 12/1081 711/205 |
| 2011/0029734 | A1 | * | 2/2011  | Pope ..................... G06F 13/385 711/118 |

* cited by examiner

*Primary Examiner* — Faisal M Zaman
(74) *Attorney, Agent, or Firm* — Birch, Stewart, Kolasch & Birch, LLP

(57) ABSTRACT

A PCI-based interfacing device with mappable port addresses to legacy I/O port addresses has an addressing circuit, a PCI controller connected to the addressing circuit and a PCI port, and an equipment controller connected to the PCI controller and an equipment port. The addressing circuit sets up a legacy I/O port address. The PCI controller transmit and receive data packets having data and one of the set of legacy I/O port addresses encapsulated therein to be processed to and from the PCI port, and output the received data packets to the equipment controller. The equipment controller converts the data packets into equipment data corresponding to the equipment port, and transmits the equipment data to the equipment port. Accordingly, the PCI-based interfacing device can perform data communication with legacy I/O port addresses.

20 Claims, 4 Drawing Sheets

PCI-BASED INTERFACING DEVICE WITH MAPPABLE PORT ADDRESSES TO LEGACY I/O PORT ADDRESSES

BACKGROUND OF THE INVENTION

1. Field of the Invention

The present invention relates to a computer interfacing device and more particularly to a PCI-based interfacing device with mappable port addresses to legacy I/O (input/output) port addresses.

2. Description of the Related Art

Users rely on input and output devices to communicate with conventional personal computer systems. The input devices normally include mice and keyboards, and the output devices include displays, speakers and printers. Each of the input devices and the output devices needs to communicate with the personal computer systems through a computer interface. The so-called computer interface is termed as a "port". The personal computer systems acquire data from the input devices or transmit data to the output devices through the ports. As far as the most frequently used input devices and output devices are concerned, early personal computer systems, such as AT/286/386/486, are all defined and built in with corresponding I/O port addresses as follows to interface with the input and output devices.

Table of I/O port addresses of AT/286/386/48

| | |
|---|---|
| 000~01F | DMA controller #1 (8237) |
| 020~03F | Interrupt controller #1 (8259A) |
| 022~012 | CHIPSET Control Registers. I/O port. |
| 040~05F | Timer (8254) |
| 060~06F | Keyboard control IC(8742) |
| 070~07F | Real Time Clock和 NMI mask |
| 080~09F | DMA page register (74LS612) |
| 0A0~0BF | Interrupt controller #2 (8259A) |
| 0C0~0DF | DMA controller #2 (8237) |
| 0F0 | Clear math co-processor busy signal |
| 0F1 | Reset math co-processor |
| 0F8~0FF | Math co-processor |
| 1F0~1F8 | Hard disk |
| 200~207 | GAME I/O |
| 278~27F | LPT2 |
| 2B0~2DF | GRAPHICS Adapter Controller |
| 2F8~2FF | COM2 |
| 300~31F | Proto Type Card |
| 360~36F | PC network |
| 378~37F | LPT1 |
| 380~38F | SDLC/Bisync com2 |
| 3A0~3AF | SDLC/Bisync com 1 |
| 3B0~3BF | Monochrome display and printer adapters |
| 3C0~3CF | EGA card |
| 3D0~3DF | CGA card |
| 3F0~3F7 | Floppy drive controller |
| 3F8~3FF | COM1 |

From the table, the personal computer systems at least have 27 sets of basic I/O port addresses, such as 0x278~0x27F, 0x378~0x37F and 0x3BC~0x3BF, embedded therein to interface with the legacy I/O ports used by various peripheral equipment, such as printers and the like. Hence, existing personal computers still keep those I/O port addresses to interface with the legacy I/O ports so that the personal computers can communicate with traditional industrial equipment through the legacy I/O ports of the industrial equipment.

To keep abreast with continuous technological development, every personal computer system is equipped with a new type of I/O interface, such as PCI (Personal Computer Interface) port or PCIe (PCI-Express) port. Once personal computer systems get upgraded or replaced, the original legacy I/O ports, such as LPT or COM, of the industrial equipment in connection with the personal computer systems fail to communicate with the personal computer systems. A PCI interface card is available in the market to convert the PCI ports thereof into corresponding legacy I/O ports. However, the PCI or PCIe interface card is operated in personal computer systems based on a plug-and-play fashion and the resources and addresses of the I/O ports are dynamically allocated by the personal computer systems. Such dynamic allocation generally assigns non-legacy I/O port addresses to the PCI-based interface card. The non-legacy I/O port addresses fail such PCI-based interface card as a solution through which the traditional industrial equipment can communicate with the personal computer systems.

SUMMARY OF THE INVENTION

An objective of the present invention is to provide a PCI-based interfacing device with mappable port addresses to legacy I/O port addresses for effectively exploring and extending the use of the legacy I/O port addresses.

To achieve the foregoing objective, the PCI-based interfacing device has an addressing circuit, a PCI controller and an equipment controller.

The addressing circuit has at least one set of legacy I/O port addresses and selects one set of the at least one set of legacy I/O port addresses.

The PCI controller is connected to the addressing circuit and a PCI port, reads the set of legacy I/O port addresses set up by the addressing circuit, and is built in with a PCI transceiving process to transmit and receive data packets having data and one of the selected set of legacy I/O port addresses encapsulated therein to and from the PCI port.

The equipment controller is connected to the PCI controller and an equipment port, converts the data packets into equipment data corresponding to the equipment port, transmits the equipment data to the equipment port, and receives equipment data from the equipment port, converts the equipment data into data packets having the set of legacy I/O port addresses and transmits the data packets to the PCI controller.

The PCI controller reads one set of legacy I/O port addresses set up by the addressing circuit, encapsulates data and one of the set of legacy I/O port addresses in data packets, and transmits the data packets to the PCI port. Therefore, a personal computer system in connection with the PCI-based interfacing device can access data in traditional industrial equipment through the PCI port virtually mapped to the legacy I/O port and the legacy I/O port addresses can be effectively utilized.

Other objectives, advantages and novel features of the invention will become more apparent from the following detailed description when taken in conjunction with the accompanying drawings.

DETAILED DESCRIPTION OF THE INVENTION

Figure 1:
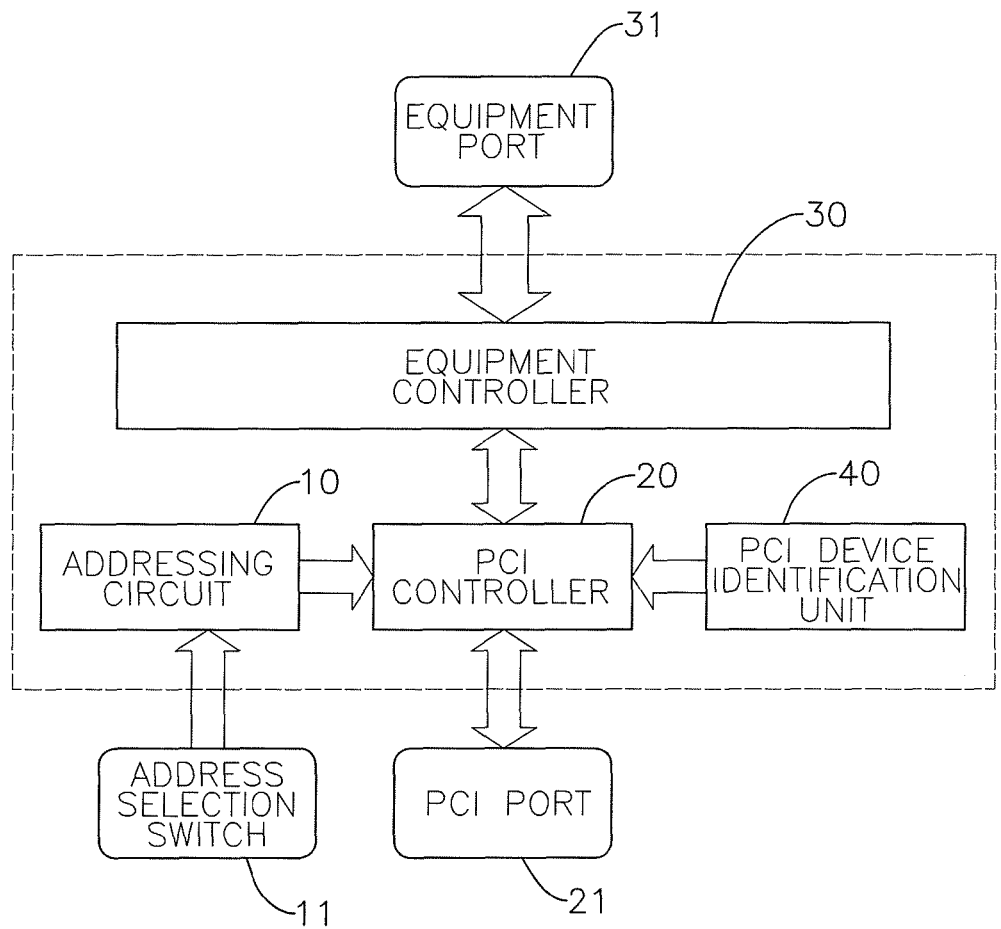
FIG. 1 is a functional block diagram of a PCI-based interfacing device with mappable port addresses to legacy I/O port addresses in accordance with the present invention.

With reference to FIG. 1, a PCI-based interfacing device with mappable port addresses to legacy I/O port addresses has an addressing circuit 10, a PCI controller 20 and an equipment controller 30.

The addressing circuit 10 has at least one set of legacy I/O port addresses. In the present embodiment, the addressing circuit 10 is built in with multiple sets of legacy I/O port addresses and is connected to an address selection switch 11. The address selection switch 11 sets up one set of the sets of legacy I/O port addresses. Each legacy I/O port is selected in an address range of 0x000~0x7FF. The addressing circuit 10 is built in with three sets of legacy I/O port addresses, namely 0x278~0x27F, 0x378~0x37F and 0x3BC~0x3BF.

The PCI controller 20 is connected to the addressing circuit 10 and a PCI port 21, and reads the set of legacy I/O port addresses set up by the addressing circuit 10. The PCI controller 20 is built in with a PCI transceiving process to transmit and receive data packets having data and one of the set of legacy I/O port addresses encapsulated therein depending on the type of operation to be performed to and from the PCI port 21. In the present embodiment, the PCI port 21 has a PCI address/data bus (AD) and a PCI control bus (Frame, OBE, IRDY, Devsel and TRDY). When executing the PCI transceiving process, the PCI controller 20 controls the PCI control bus to transmit and receive the data packet having the set of legacy I/O port addresses to and from the PCI address/data bus.

The equipment controller 30 is connected to the PCI controller 20 and an equipment port 31, converts the data packets into equipment output data corresponding to the connected equipment port 31, transmits the equipment output data to the equipment port 31, and receives equipment input data from the equipment port 31, converts the equipment input data into data packets having the legacy I/O port address and transmits the data packets to the PCI controller 20. In the present embodiment, the equipment port 31 corresponds to the set of legacy I/O port addresses (0x378~0x37F) and is a parallel port (LPT1).

Figure 2:
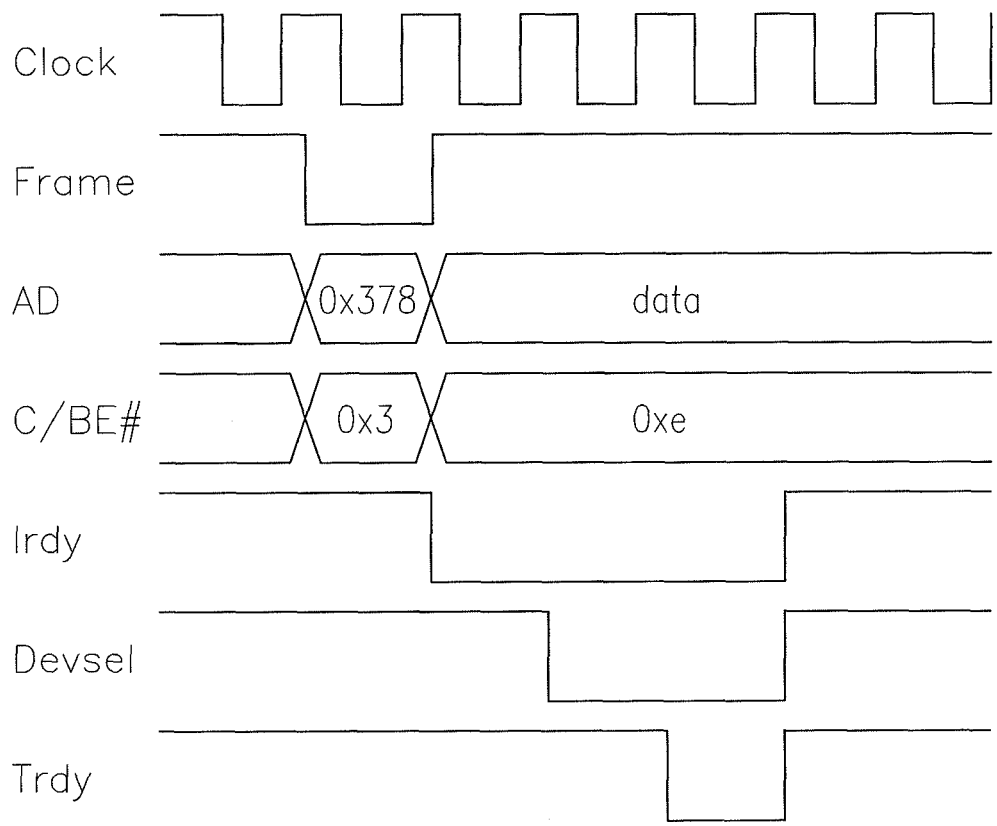
FIG. 2 is a timing diagram of writing data into a personal computer system in accordance with the present invention.
Figure 3:
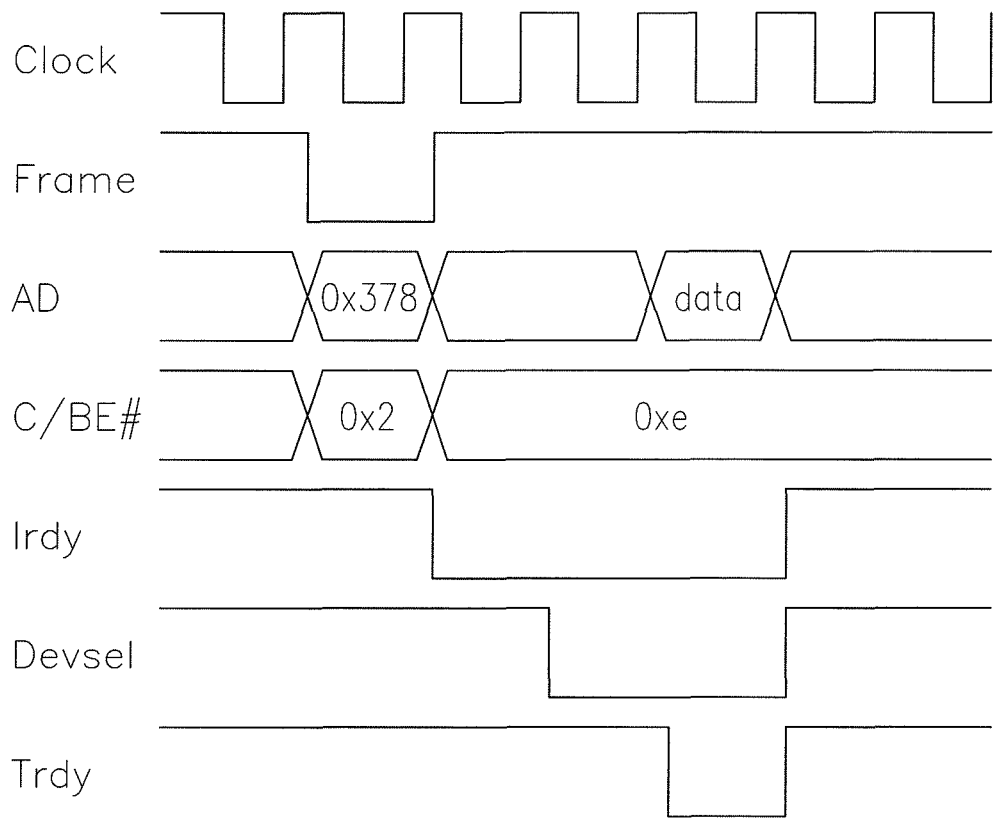
FIG. 3 is a timing diagram of reading data from a personal computer system in accordance with the present invention.

With reference to FIGS. 2 and 3, when intending to read or write from and to a personal computer system through a legacy parallel port (LPT1) with an I/O address (0x378) using the PCI transceiving process, the PCI controller instructs the PCI control bus (Frame, C/BE, IRDY, Devsel and TRDY) to generate a corresponding signal and transmit the I/O address (0x378) to the personal computer system via the PCI address/data bus (AD). When the personal computer system responds to the PCI controller 20 through the PCI control bus of the personal computer system, the PCI controller 20 then transmits and receives data to and from the personal computer system through the PCI address/data bus (AD).

Furthermore, speaking of the operation of the PCI port 21 on a personal computer system, the personal computer system first scans to ascertain if there is any equipment inserted in the PCI port 21, and if yes, then the system reads and writes from and to the PCI port 21 through the foregoing PCI control bus and PCI address/data bus. Hence, if the PCI-based interfacing device of the present invention is plugged in the PCI port 21 of the personal computer system with no equipment being inserted in the PCI-based interfacing device, the PCI-based interfacing device sends no device code to the personal computer system for allocating resources and addresses of I/O ports. As a result, the personal computer system immediately stops providing clock signals and the result is that all read and write activities are suspended. To tackle this issue, the PCI-based interfacing device further has a PCI device identification unit 40. The PCI device identification unit 40 is electrically connected to the PCI controller 20 and outputs a device code to the PCI controller 20. The PCI controller 20 outputs the received device code to the PCI port 21. In the present embodiment, the PCI device identification unit 40 is a PCI-to-ISA bridge.

As the PCI controller 20 can output the device code to the PCI port 21 using the PCI device identification unit 40, the foregoing personal computer system can ascertain if equipment is inserted in the PCI port 21.

Figure 4:
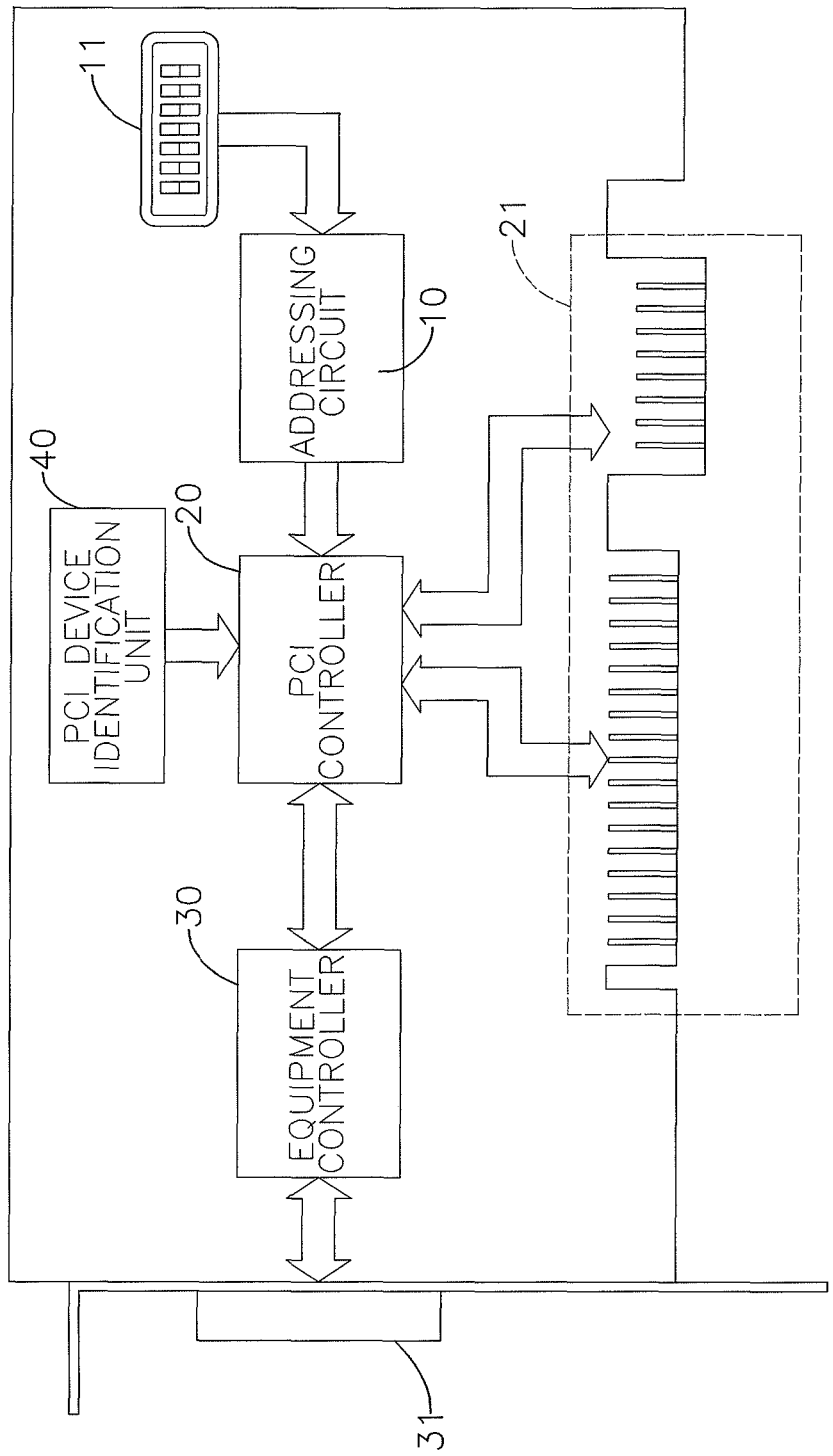
FIG. 4 is a schematic view of the PCI-based interfacing device in FIG. 1.

With reference to FIG. 4, a substantial application of the PCI-based interfacing device is shown. The address selection switch 11 is a dip switch. The dip switch and the PCI-based interfacing device are integrated on an identical interface card. If users need to switch to a different legacy I/O port, such as a parallel port (LPT1, LPT2 or printer port), the address selection switch 11 can be switched to output corresponding I/O port address, such as 0x378, 0x278 or 0x3BC. Thus, users can conveniently adjust a corresponding legacy I/O port address according to equipment currently in connection with the PCI-based interfacing device. Moreover, the addressing circuit 10 can not only selectively output one set of legacy I/O port addresses but also have an address-setting program embedded therein for setting a legacy I/O port address. In the present embodiment, the address selection switch 11 is configured to have a designated switch operated in collaboration with the address setup program. When the designated switch is activated, the addressing circuit 10 selects a legacy I/O port address through the address setup program. When the designated switch is deactivated, the addressing circuit 10 selects the legacy I/O port address through the address selection switch 11.

In sum, the PCI controller 20 transmits data packets encapsulating data and a legacy I/O port address provided by the addressing circuit 10 to a corresponding PCI port so that the PCI-based interfacing device can provide the PCI port mapped to a legacy I/O port of a personal computer system connected with the PCI-based interfacing device, thereby effectively exploring and extending the use of the legacy I/O port addresses.

Even though numerous characteristics and advantages of the present invention have been set forth in the foregoing description, together with details of the structure and function of the invention, the disclosure is illustrative only. Changes may be made in detail, especially in matters of shape, size, and arrangement of parts within the principles of the invention to the full extent indicated by the broad general meaning of the terms in which the appended claims are expressed.

What is claimed is:

1. A PCI-based interfacing device with mappable port addresses to legacy input/output (I/O) port addresses comprising:

an addressing circuit having at least one set of legacy I/O port addresses and selecting one set of the at least one set of legacy I/O port addresses;

a PCI controller connected to the addressing circuit and a PCI port, reading the set of legacy I/O port addresses set up by the addressing circuit, and built in with a PCI transceiving process to respectively transmit and receive data packets having data and one of the selected set of legacy I/O port addresses encapsulated therein to and from the PCI port; and an equipment controller connected to the PCI controller and an equipment port, converting the data packets received from the PCI controller into equipment output data corresponding to the equipment port, transmitting the equipment output data to the equipment port, and receiving equipment input data from the equipment port, converting the equipment input data into data packets having the set of legacy I/O port addresses and transmitting the data packets to the PCI controller.

2. The PCI-based interfacing device as claimed in claim 1, wherein the addressing circuit is built in with multiple sets of legacy I/O port addresses and is connected to an address selection switch, and the address selection switch sets up one set of the sets of legacy I/O port addresses.

3. The PCI-based interfacing device as claimed in claim 2, wherein the address selection switch is a dip switch.

4. The PCI-based interfacing device as claimed in claim 1, wherein the addressing circuit is built in with an address setup program for setting a legacy I/O port address.

5. The PCI-based interfacing device as claimed in claim 2, wherein the addressing circuit is built in with an address setup program for setting a legacy I/O port address.

6. The PCI-based interfacing device as claimed in claim 1, wherein each legacy I/O port is selected in an address range of 0x000~0x7FF.

7. The PCI-based interfacing device as claimed in claim 2, wherein each legacy I/O port is selected in an address range of 0x000~0x7FF.

8. The PCI-based interfacing device as claimed in claim 3, wherein each legacy I/O port is selected in an address range of 0x000~0x7FF.

9. The PCI-based interfacing device as claimed in claim 4, wherein each legacy I/O port is selected in an address range of 0x000~0x7FF.

10. The PCI-based interfacing device as claimed in claim 5, wherein each legacy I/O port is selected in an address range of 0x000~0x7FF.

11. The PCI-based interfacing device as claimed in claim 1, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

12. The PCI-based interfacing device as claimed in claim 2, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

13. The PCI-based interfacing device as claimed in claim 3, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

14. The PCI-based interfacing device as claimed in claim 4, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

15. The PCI-based interfacing device as claimed in claim 5, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

16. The PCI-based interfacing device as claimed in claim 6, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

17. The PCI-based interfacing device as claimed in claim 7, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

18. The PCI-based interfacing device as claimed in claim 8, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

19. The PCI-based interfacing device as claimed in claim 9, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

20. The PCI-based interfacing device as claimed in claim 10, wherein the PCI port has a PCI address/data bus and a PCI control bus, when executing the PCI transceiving process, the PCI controller controls the PCI control bus to transmit and receive the data packet having the set of legacy I/O port addresses to and from the PCI address/data bus.

* * * * *